United States Patent [19]
Bertin

[11] 3,772,927
[45] Nov. 20, 1973

[54] BELT TRANSMISSION DEVICE

[76] Inventor: Jean Henri Bertin, 1, rue Deleau, 92 Neuilly-sur-Seine, France

[22] Filed: July 26, 1972

[21] Appl. No.: 275,151

[30] Foreign Application Priority Data
July 30, 1971 France .............................. 7128056

[52] U.S. Cl. ........................ 74/217 R, 74/242.11 S
[51] Int. Cl. ............................ F16h 9/04, F16h 7/12
[58] Field of Search .................. 74/217 R, 242.11 S

[56] References Cited
UNITED STATES PATENTS
499,159   6/1893   Crafts ................................ 74/217 R
1,151,837  8/1915  Tannewitz ......................... 74/217 R
3,636,784  1/1972  Sanstrom .......................... 74/217 R Primary Examiner—Leonard H. Gerin
Attorney—Alfred W. Breiner

[57] ABSTRACT

Speed change box comprising several transmission assemblies of which each, corresponding to a unique and different transmission ratio, comprises a respective transmission belt which can be applied, to permit the transmission of force, by pressure of a fluid, to a drive pulley and a driven pulley, and means for selectively applying the pressure of the fluid to a transmission assembly corresponding to the chosen ratio.

25 Claims, 19 Drawing Figures

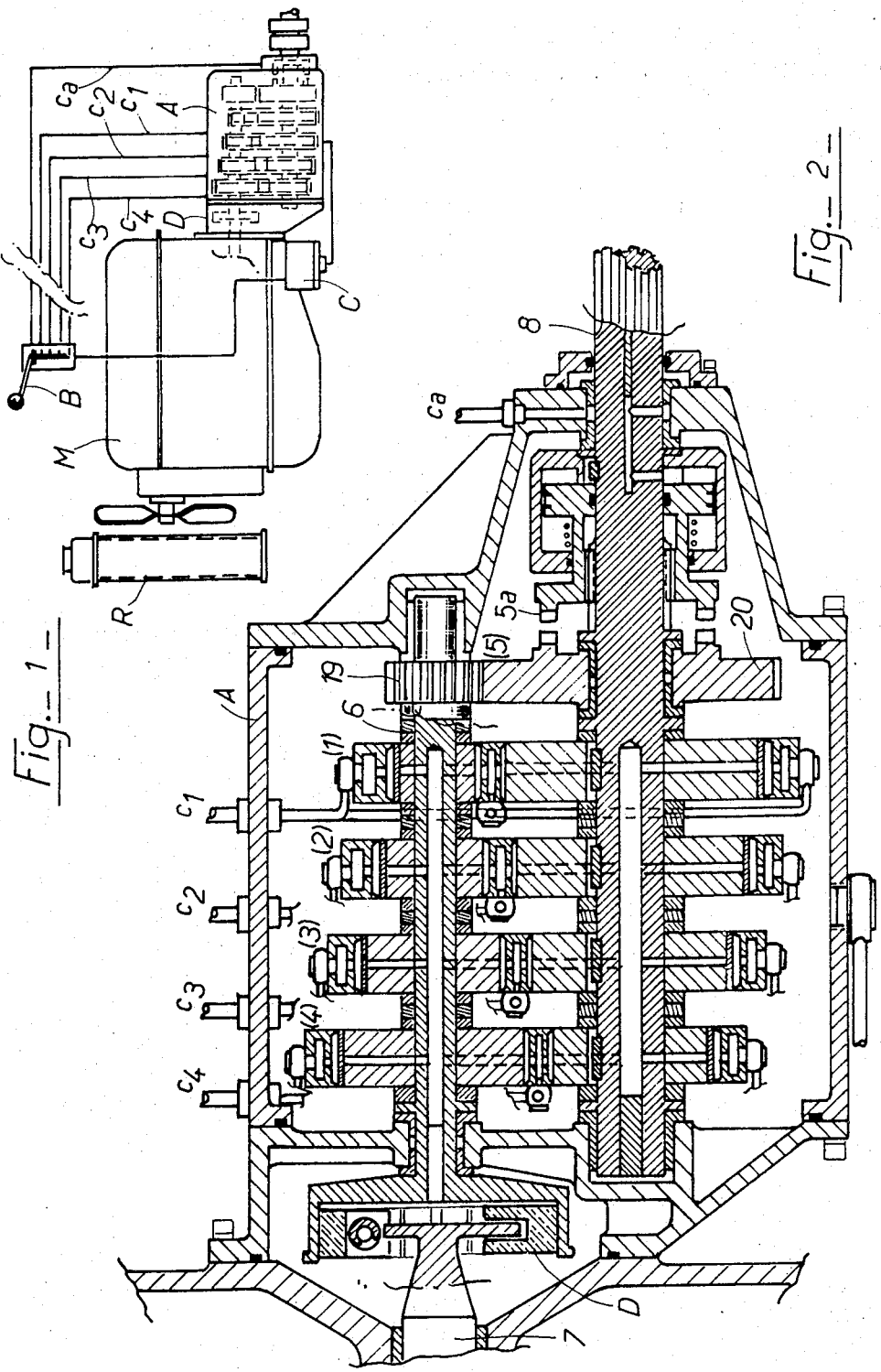

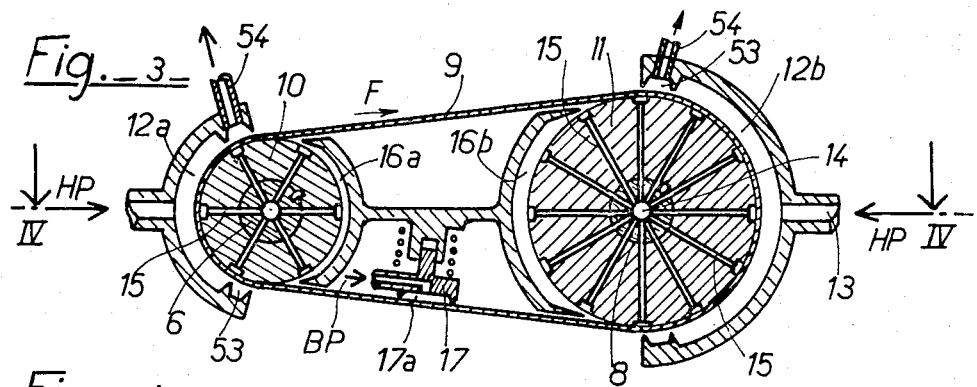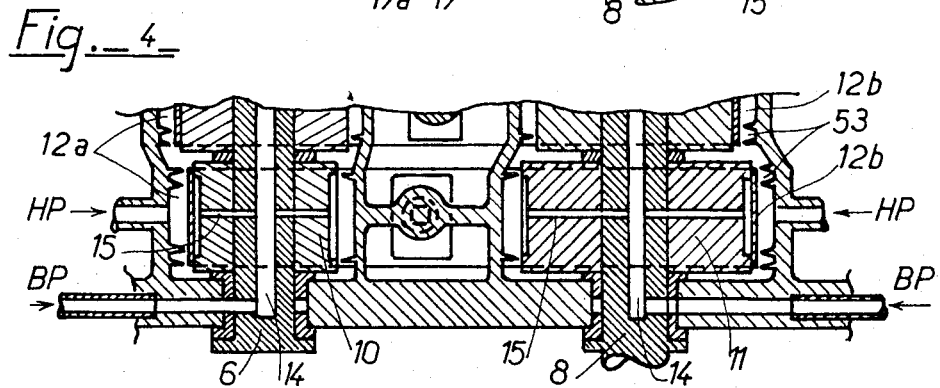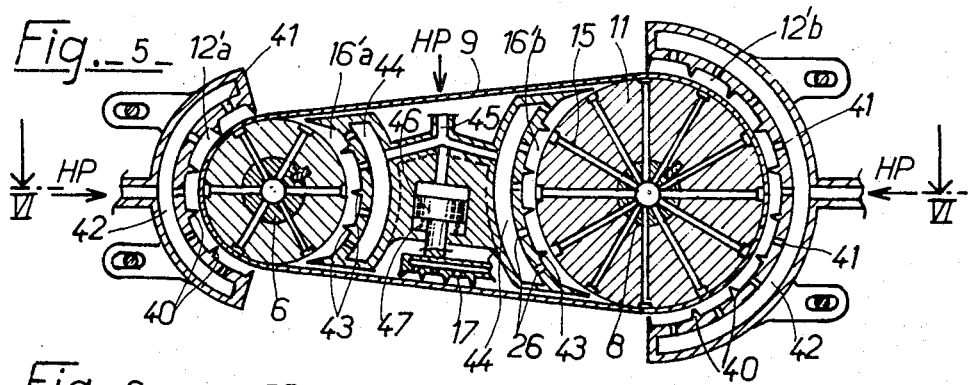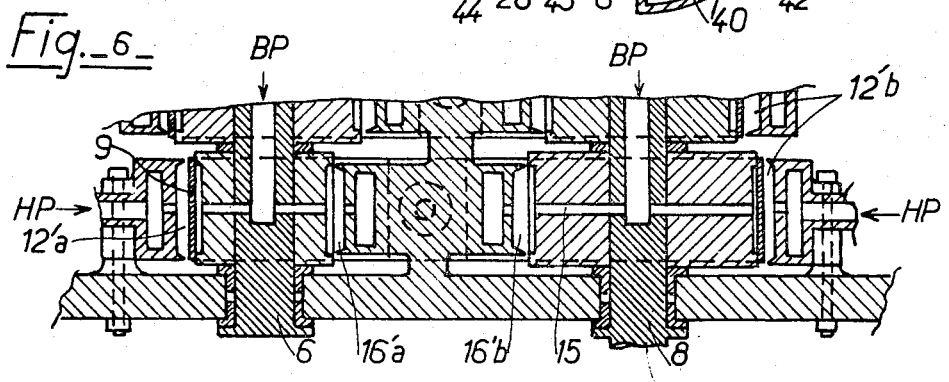

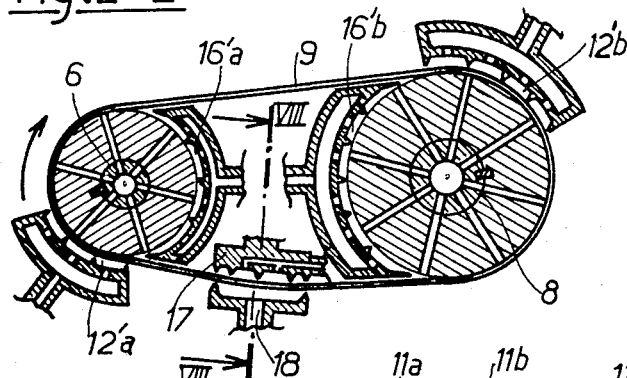
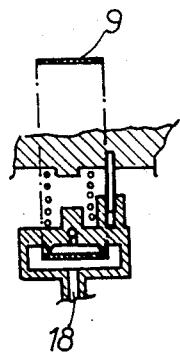
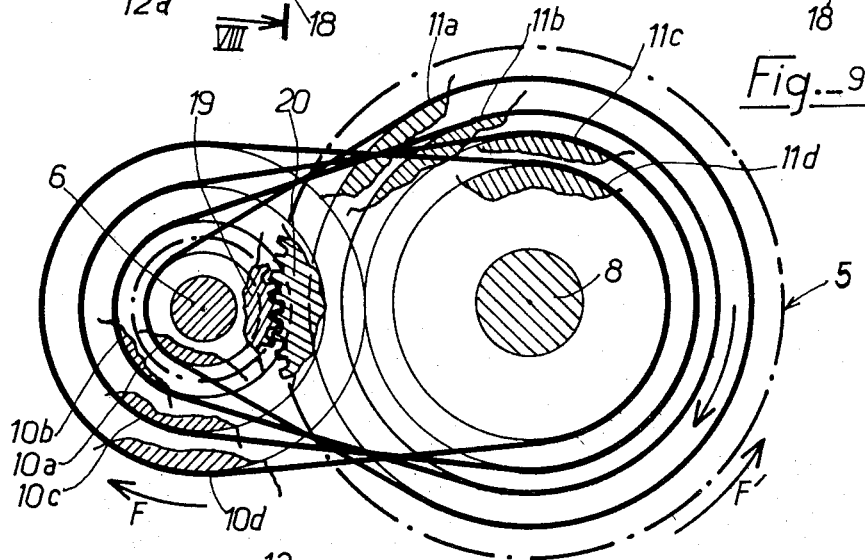
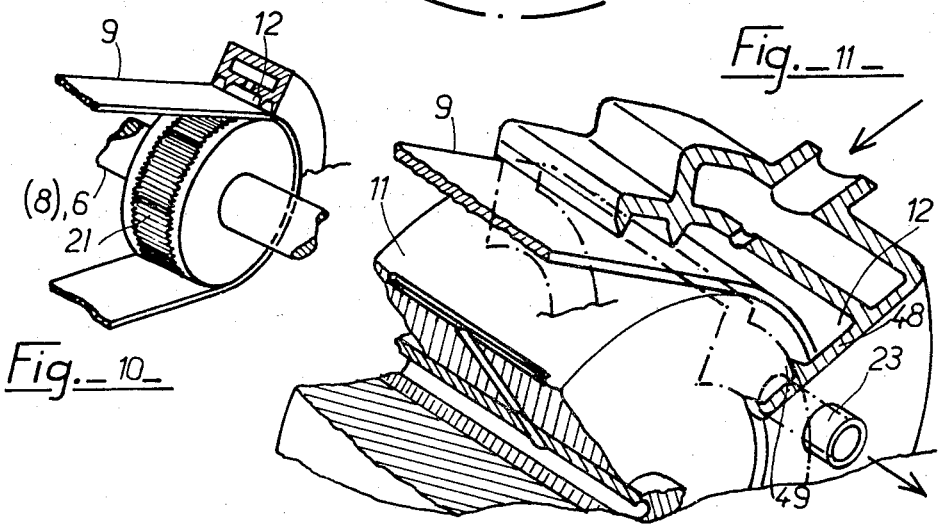

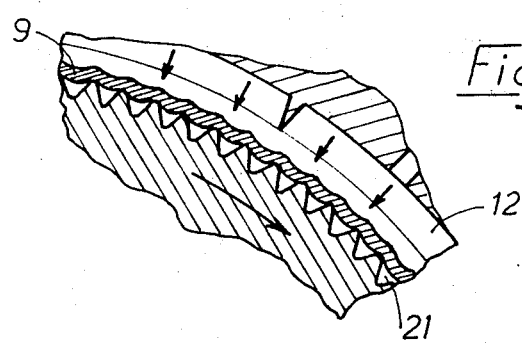
Fig._14_
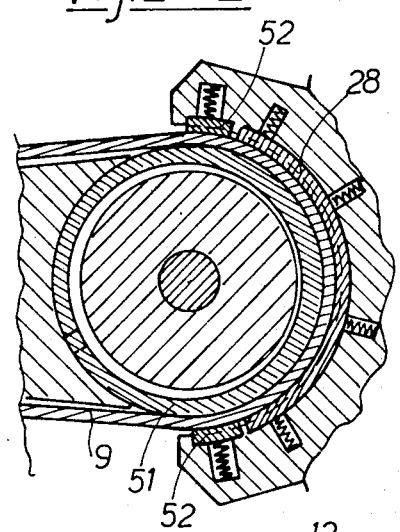
Fig._15a_
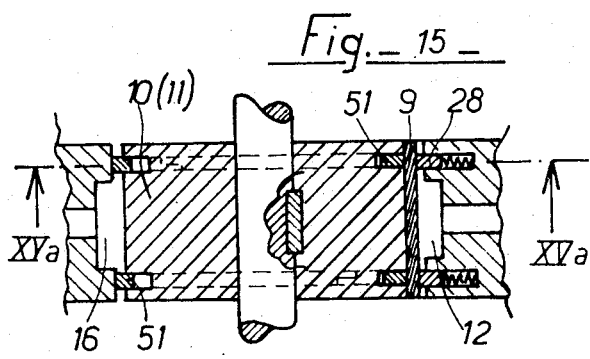
Fig._15_
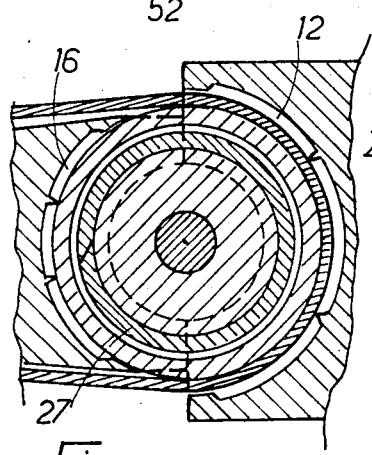
Fig._16a_
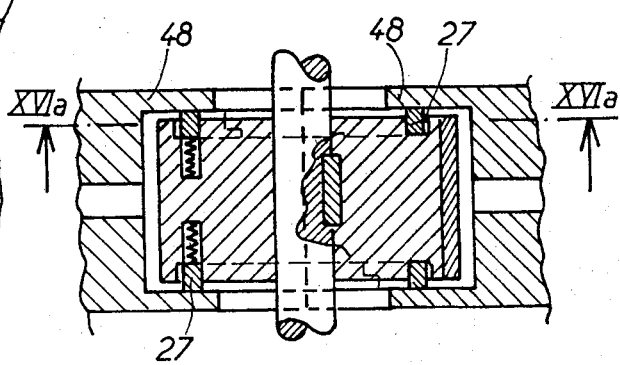
Fig._16_

BELT TRANSMISSION DEVICE

The invention relates to devices permitting the transmission of rotary motion from a driving motion from a driving shaft to one or more driven shafts, possibly with several possible gear ratios. The invention further relates particularly but not exclusively to a motor vehicle gear box.

The applicant has already applied for the French Pat. No. 2,431,738 describing a system of transmission by belt or band, in which the pressure of a fluid is used to augment the pressure of the said band on the support surface, and consequently to increase the driving force of the band.

The applicant has found that the use of such belts, in a well suited form, facilitated gear changes and that it was possible to avoid, practically completely, the undesirable energy losses by the transmissions in normal service; in addition, thanks to the good application of the belts on the drive surfaces, slippage, and as a consequence the wear of belts of this type, are reduced.

The device according to the invention comprises several transmission assemblies each comprising a belt associated with a drive pulley and a driven pulley, the belts being able to be applied selectively on their respective pulleys by fluid cushions which are established facing at least one part of the contact surface of the pulleys and the belts.

According to an embodiment of the invention, the transmission device may comprise several shafts, for example a driving shaft and several driven shafts, each driven shaft being able to be coupled to the drive shaft by means of at least one assembly of pulleys and belts. The transmission ratio of the pulley/belt assemblies of each driven shaft can be the same or different. In addition, each driven shaft may comprise several pulley/belt assemblies having different transmission ratios.

According to another embodiment of the invention, the transmission device comprises several pulley/belt transmission assemblies of which each, corresponding to a unique and different transmission ratio, comprises a respective transmission belt able to be applied, to permit the transmission of the force, by the pressure of a fluid, onto a drive pulley and a driven pulley, and means for selective application of the pressure of the fluid to a transmission assembly corresponding to the ratio chosen.

Preferably, according to the invention, means are provided for moving those belts which are not going to be used away from their respective pulleys, to maintain them disengaged. These means can be arranged for example to establish a weak counter-pressure of fluid between the pulleys and the belts of the transmission assemblies which one wishes to maintain disengaged. Advantageously, these means are permanently in action, their action being counterbalanced by the pressure exerted by the cushions which apply the belts onto their pulleys.

Finally, it should be mentioned that the arrangement according to the invention is particularly well suited, as will be seen, to the making of speed change boxes comprising in all two shafts, that is a drive shaft and a driven shaft, reversing being obtained without any supplementary intermediate shaft.

The description which follows, relating to the annexed drawings, given as an example which is no way limiting, will permit a better understanding of how the invention can be carried out, the particulars which arise from both the drawings and the text forming, it is to be understood, part of the invention.

In these drawings:

FIG. 1 is a diagrammatic view of the assembly of an installation according to the invention;

FIG. 2 is a sectional view on a larger scale of the speed change box A of FIG. 1;

FIG. 3 is a sectional view showing a transmission device according to the invention, in engaged position;

FIG. 4 is a sectional view along the line IV—IV of FIG. 3;

FIG. 5 is a variation of the embodiment of FIG. 3;

FIG. 6 is a sectional view along the line VI—VI of FIG. 5;

FIG. 7 is a variation of the embodiment of FIG. 5;

FIG. 8 is a sectional view along the line VIII—VIII of FIG. 7;

FIG. 9 is a view on a larger scale, partly cut away, showing the transmission device according to the invention comprising means for reversing the movement of rotation of the driven shaft;

FIG. 10 is a perspective view showing a pulley with a serrated surface;

FIG. 11 is a perspective view on a larger scale showing a detail of the device which confines the cushions for applying the belts onto the pulleys;

FIG. 14 is a detailed view showing a device permitting the adhesion of the belts to the pulleys to be increased;

FIG. 15 is a sectional view showing a pulley furnished with segments to limit leakages;

FIG. 15a is a sectional view taking along the line XVa—XVa of FIG. 15;

FIG. 16 is a variation of the embodiment of FIG. 15;

FIG. 16a is a sectional view along the line XVIa—XVIa of FIG. 16.

Figure 12:
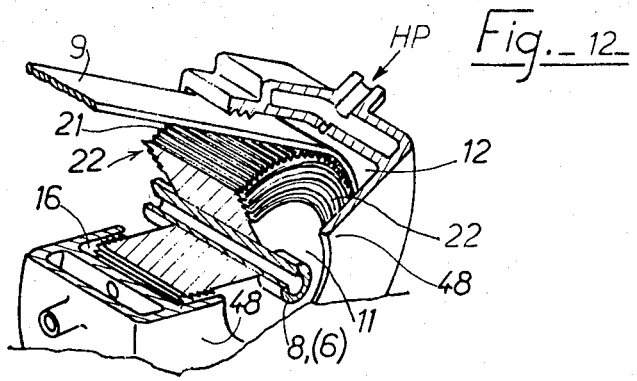
FIG. 12 is a variation of the embodiment of FIG. 11, showing a pulley with notches and serrations.

In FIG. 1 is seen an assembly of an installation according to the invention, particularly applicable to motor vehicles. The motor M is provided with a radiator R and with a transmission box A according to the invention, with several speeds, which are selected by means of a fluid distributor comprising a hand lever B. An appropriate element C, actuated by the motor M, furnishes oil under pressure to the box of the control lever, which directs this oil along a corresponding channel $c_a$ or $c_1$, $c_2$, $c_3$, $c_4$ according to whether the oil pressure in box A is to be applied, according to the case, to actuate respectively reverse movement or the first, second, third or fourth speed. It is particularly convenient, but not obligatory, to use as the fluid serving to apply a belt onto its pulleys, the oil present at the bottom of the housing of the motor M and serving to lubricate the motor.

Thus in speed change box A (FIG. 2), transmission assemblies, each comprising two pulleys and one connecting belt, of the type which is applied by fluid under pressure, replace the usual pairs of gear wheels. A clutch D, for example of the conventional centrifugal type, is interposed between the shaft 7 of the motor and the drive shaft 6 of the box, this latter driving the driven shaft 8 via the transmission assemblies. The driven shaft 8 and the drive shaft 6 are, advantageously, parallel.

In the present case, four fixed speeds have been provided, 1, 2, 3, 4 (this last being stepped up) and a reverse 5. This reverse motion can be obtained very simply by the use of two engaged gear transmissions and a jaw clutch 5a; it could also have been obtained using the same constitution of that of the other transmission assemblies, by crossing the belt which then takes the form of a "figure 8."

According to FIGS. 3 and 4, a transmission assembly according to the invention comprises a flexible band 9, a belt for example, transmitting the movement, in the direction of the arrow F, at a chosen multiplication ratio, from a drive pulley 10 to a driven pulley 11, respectively integral with shafts 6 and 8. The belt 9 can be applied on the pulleys 10 and 11 by fluid cushions (oil) under pressure 12a, and 12b. The cushions 12a, 12b supplied by the duct connected to the circuit 13 exert a pressure, termed engaging pressure, on the whole of the contact surfaces between the pulleys and the belts.

The devices which confine the cushions 12 can comprise detent chambers 53 limiting leakages, and are connected to fluid evacuation conduits 54. The cushions 12a and 12b are connected to the speed selector B, which supplies them from a conduit termed "high pressure circuit."

In order to obtain minimal frictional forces when the belt should not be in contact with the pulleys 10 and 11 (disengaged position), a layer of fluid at a pressure lower than the pressure of the cushions 12a, and delivered by a circuit which is termed the "low pressure circuit," is created between the belt 9 and the pulleys 10 and 11.

The fluid used to form these layers can be the same as that utilized to form the cushions 12, oil for example, but to limit the forces due to internal shearing of the fluid it is advantageous to choose a fluid of lower viscosity such as air or any other gas.

The low pressure fluid feed is effected by the channels 14 (FIG. 4) which are formed in the shafts 6 and 8 of the pulleys 10 and 11; the layer of fluid is distributed over the surface of the pulleys by radial channels 15.

In the example shown, the channels 14 feed all the pulleys.

Because of the difference of pressure existing between the cushions 12, on the one hand, and the layers of fluid formed between the belts 9 and the pulleys 10 and 11, on the other hand, the conduits 15 can be permanently fed by the channels 14; thus the belts which are not applied on to their pulleys by the high pressure cushions 12 are automatically maintained disengaged.

Other devices for disengaging the belts may be used, possibly in combination with the fluid layers formed by the channels 15. For example the enclosures confining the cushions 12 of the devices which are to be disengaged can be connected to a source of fluid at a pressure lower than the ambient pressure. Or again, if the belts are constituted by or comprise magnetisable parts they can be attracted by electromagnets placed within the cushions 12 and supplied with electric current when it is desired to disengage the belts. The control of these electromagnets can be coupled to the control B of the fluid distributor of the high pressure circuit.

To avoid leakages of fluid from the high pressure circuit via the radial channel 15 which are not masked by the hand 9, opposing (or reaction) cushions, advantageously fixed, 16a, 16b, can be provided facing the surfaces of the pulleys not in contact with the belt 9. These cushions permit the equilibration of a part of the application forces acting on the two shafts of the pulleys which are common to different transmissions assemblies 1, 2, 3, 4 and 5.

A tensioner 17 with a fluid slide block 17a (supplied from the low pressure circuit) is advantageously provided between the pulleys 10 and 11, particularly to compensate possible lengthening and to compensate the flapping of the belts 9.

FIGS. 5 and 6 show a variant embodiment of the invention according to which the cushions 12'a and 12'b are provided with internal partitions 40 which define elementary cushions separately supplied via calibrated orifices 41 connecting them to a chamber 42.

In this embodiment, the opposing cushions 16'a and 16'b also subdivided by partitions 43, are separately fed from chambers 44 and 44'.

These chambers are connected by a conduit 45 to a source of fluid under pressure constituted for example by the high pressure circuit. In this case, the feed of the chambers 44, 44' is effected conjointly with that of chambers 42 of the cushions for application of the belts.

The fluid slide block 17 may be applied to the belts by a jack 46 when it is supplied from the conduits 45. An opposing spring 47 may be provided to move the slide block 17 away from the belt when the latter is disengaged. The slide block 17 may be permanently fed (low pressure circuit) or be supplied conjointly with the belt application cushions via conduit 45 connected to the high pressure circuit.

When the counter-reaction cushions 16' of a transmission assembly are fed with fluid under pressure, they may serve to form fluid layers between the pulleys and the belts of other transmission assemblies which are to be maintained disengaged. For this purpose, taking account of a judicious distribution of losses of load, a part of the fluid passed along the channel 45 into the cushions 16' is transmitted by the radial channels 15 and the axial channel 14 to the axial channels 15 of the transmission assemblies which are to be disengaged. In this case, the feed of the axial channels 14 via the low pressure channel may be eliminated.

According to the variant of FIGS. 7 and 8, the cushions 12'a, and 12'b exert their pressure (on engagement) on only a part of the pulley/belt contact surfaces, for example about a sixth of the circumference, so as to utilize to a maximum the effect of rolling. For this, the cushions 12 are situated substantially on the line of the zone of engagement of the belts and of their respective pulleys. Opposing cushions 16'a, 16'b are provided on the whole of the surfaces of the pulleys not in contact with the belt 9.

This tensioner 17 may be integral with a box for recovery of leakages of fluid, comprising an exit 18.

FIG. 9 illustrates a complete transmission assembly including also the reversing device 5. Gear wheels 19 and 20, which can also be seen on FIG. 2, and mounted respectively on the drive shaft 6 and the driven shaft 8, permit the movement to be reversed from the sense F to the sense F'. As may be seen in FIG. 9, the different multiplication ratios : first (10a–11a), second (10b–11b), third (10c–11c), fourth (10d–11d) may be obtained by using belts 9 of the same length (but which can be of different widths), which is an advantage in relation to the classical gear boxes where the modulus of the pinions is a limiting factor.

According to FIGS. 10, 12 and 14, the serrations (or holes of any shape) 21 permit a better drive coefficient of the belt 9 on the pulleys to be obtained. The band or belt 9 is deformed elastically by the pressure of the cushions 12, producing "pseudo-teeth" which mesh with the hollows of the pulley.

The cheeks of the pulleys may be furnished with grooves 22 (FIG. 12) which cooperate with lateral extensions 48 of the confinement devices for the cushions 12 and 16 and limit the leakages of these cushions.

The cheeks of the pulleys may be smooth (FIG. 11), labyrinths being formed on the lateral extensions 48 of the devices confining the cushions 12 and 16.

The lateral extensions 48 of the confinement devices may comprise conduits for the evacuation of leakages of fluid forming the cushions 12 (see FIG. 11, these conduits not been shown in FIG. 12).

Figure 13A:
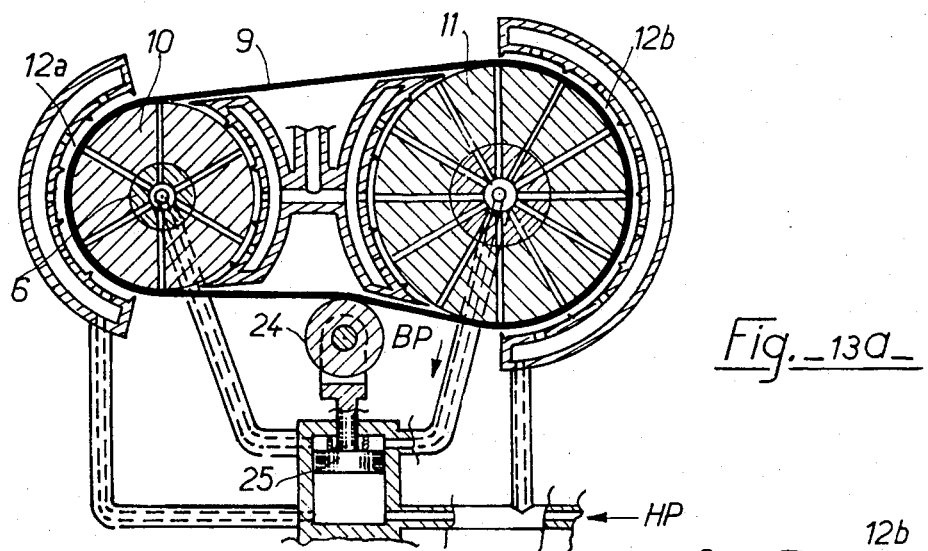
FIG. 13a is a sectional view of a transmission device according to the invention, furnished with a roller tensioner in engaged position.
Figure 13B:
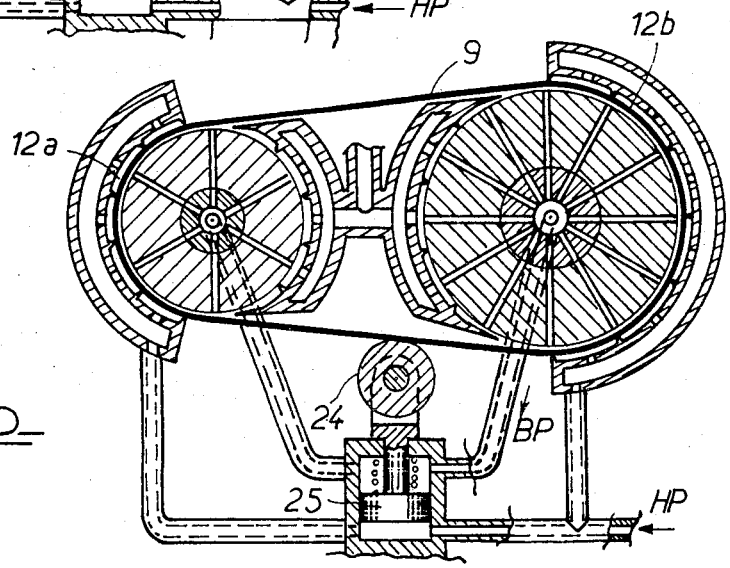
FIG. 13b is a view analogous to FIG. 13a, the transmission device being in the disengaged position.

According to FIGS. 13a and 13b, the device according to the invention is provided with a pulley tensioner 24 coupled to the high pressure and low pressure circuits by a jack 25.

In the engaged position (FIG. 13a), the tensioner coupled to the high pressure circuit exerts its pressure on the belt 9, increasing the rolling length of the latter on the pulleys 10 and 11, which diminishes the losses in the transmission of the motion.

In the disengaged position (FIG. 13b), the tensioner is coupled to the low pressure circuit and moves away from the belt 9.

The transmission assemblies according to the invention may comprise segments for limiting the leakages of the cushions.

For example, there may be seen in FIGS. 15 and 15a a part of a transmission assembly of which the pulley 10 (or 11) comprises grooves formed on its surface or revolution and in which are mounted segments 51 which cooperate with the internal face of the belt 9 and the devices for confining the opposed cushions 16. These segments limit the leakages of the low pressure circuit.

The leakages of the high pressure circuit are limited by the segments 28 which cooperate with the external face of the belts and are situated substantially facing the segments 51.

Segments 52, whose major length extends transversely of the belts 9, may be provided at the extremities of the devices for confining the cushions 12.

As may be seen from FIGS 16 and 16a, the lateral extensions 48 of the devices for confining the cushions 12 and 16 may cooperate with segments 27 mounted in grooves formed on the lateral faces of the pulleys.

Because of the absence of jaw clutches, the space requirement of the device is that of a conventional gear box (smaller in width than a conventional gear box).

The transmission device according to the invention also has the advantage of not introducing axial load on the shafts.

It goes without saying that the embodiments described are only examples and that it would be possible to modify them, particularly by substitution of equivalent techniques, without departing for this reason from the scope of the invention.

I claim:

1. Device for transmission of a rotary motion by means of belts, comprising on the one hand several transmission assemblies of which each comprises a driving pulley, at least one driven pulley and a belt which is adapted to transmit a driving force from the said driving pulley to the said driven pulley and on the other hand means of selection including fluid cushion established facing at least a part of the contact surfaces between pulleys and belts, to apply selectively each belt to its respective pulleys for transmitting a said drive effort.

2. Transmission device according to claim 1, in which one of the pulleys of each transmission assembly is connected to a single shaft, the other pulley of each assembly being able to be connected to several shafts, it being possible for the transmission ratios of the said transmission assemblies to be different.

3. Transmission device according to claim 1, able to be used as a speed change box for automobile vehicles, in which each transmission assembly corresponds to a unique and different transmission ratio, a single assembly being engaged.

4. Transmission device according to claim 2, able to be used as a speed change box for automobile vehicles, in which each transmission assembly corresponds to a unique and different transmission ratio, a single assembly being engaged.

5. Transmission device according to claim 1, in which different drive pulleys are all mounted on a rotationally driven drive shaft and in which the different driven pulleys are mounted on a parallel driven shaft, and als in which the said means of selection comprise a changeover valve fed by a fluid under pressure and connected to conduits which conduct the fluid towards each of the belts, the pressure of the fluid being thus directed at will under the control of the changeover valve onto the belt of the chosen transmission assembly, applying it against its pulleys.

6. Transmission device serving as a speed change box for an automobile vehicle, according to claim 1, in which the different drive pulleys are all mounted on a rotationally driven drive shaft and in which the different driven pulleys are mounted on a parallel driven shaft, and also in which a toothed wheel is mounted on each of the said shafts, these toothed wheels being in mesh, one of the toothed wheels being mounted fixedly on its shaft and the other being provided with means of rendering it integral with the shaft, able to be actuated by selection of the said oil pressure under the control of the said valve, to obtain reverse motion.

7. Transmission device according to claim 1, in which the latter comprises means for applying a counter-pressure of fluid in the transmission assemblies which are not to function, to detach positively the belt from its pulleys.

8. Transmission device according to claim 1, in which the latter comprises means for applying a counter-pressure of fluid in the transmission assemblies which are not to function, to positively detach the belt from its pulleys, the said fluid being a gas under pressure.

9. Transmission device according to claim 1, in which the latter comprises means for applying a counter-pressure of fluid in the transmission assemblies which are not to function, to detach positively the belt from its pulleys, the said fluid being constituted by oil from the housing of an automobile vehicle.

10. Transmission device for transmission of a rotary motion by means of belts, comprising on the one hand several transmission assemblies of which each comprises a drive pulley, a driven pulley and a belt which is adapted to transmit a driving force from the said driving pulley to the said driven pulley and on the other hand selection means inlcuding cushions of fluid established facing at least a part of the surfaces of contact between pulleys and belts, to apply selectively each belt onto its respective pulleys to transmit a said driving force, and a series of radial passages formed in each pulley connecting to an axial passage through which another fluid can be supplied to apply a counter-pressure for detachment of the belt.

11. Transmission device for transmission of a rotary motion by means of belts, comprising on the one hand several transmission assemblies of which each comprises a driving pulley, a driven pulley and a belt which is adapted to transmit a driving force from the said driving pulley to the said driven pulley and on the other hand selection means including cushions of fluid established facing at least a part of the contact surfaces between pulleys and belts, to apply selectively eac belt onto its respective pulleys to transmit a said driving force, and a series of radial passages formed in each pulley connecting to an axial passage through which another fluid can be supplied to apply a counter-pressure for detachment of the belt, this other fluid being oil serving to apply a belt for the transmission of a driving force.

12. Transmission device according to claim 1, in which a said transmission assembly comprises a tensioner pressing on the belt to tension it under the effect of a pressure of fluid.

13. Transmission device according to claim 1, in which a said transmission assembly comprises a tensioner pressing on the belt to tension it under the effect of a pressure of fluid, the fluid acting on the tensioner being constituted by oil under a pressure less than that of the oil serving to apply a belt for the transmission of forces.

14. Transmission device according to claim 1, in which a said transmission assembly comprises, between the belts and the side opposed to that of the application of the belt on the pulley, an equilibrating chamber for the thrust on the shaft.

15. Transmission device according to claim 1, in which the cushions of fluid under pressure are adapted to apply the belt substantially on half of the circumference of the pulley.

16. Transmission device according to Claim 1, in which cushions of fluid under pressure are adapted to apply the belt onto a small part, less than a half, of the circumference of the pulley.

17. Transmission device according to claim 1, in which the cushions of fluid under pressure are adapted to apply the belt onto about a sixth of the circumference of the pulley.

18. Transmission device according to claim 1, in which a chamber provided with perforations surrounds the pulley and in which means are provided for supplying the said fluid into this chamber, such that the cushions of fluid under pressure apply the belt at several points of the circumference of the pulley, 19. Transmission device according to claim 1, in which a chamber provided with perforations surrounds the pulley and in which means are provided for supplying the said fluid into this chamber, such that the cushions of fluid under pressure apply the belt at several points of the circumference of the pulley, separating ribs being provided between the chamber and the belt, between the said perforations.

20. Transmission device according to claim 1, in which a said transmission assembly comprises a tensioner pressing on the belt to tension it under the effect of a pressure of fluid, the said tensioner being provided with means for recovering surplus oil.

21. Transmission device according to claim 1, in which the pulleys are provided with serrations on their surface cooperating with the belt in a manner to produce a better coefficient of driving of the said belt on the said pulleys.

22. Transmission device according to claim 1, in which the pulleys are provided with serrations on their surface cooperating with the belt in a manner to produce a better coefficient of driving of the said belt on the said pulleys, the belt being deformed elastically by the pressure of projections constituting "pseudo-teeth" which cooperate with the hollows of the pulleys.

23. Transmission device according to claim 1, in which the lateral surfaces of the pulleys are provided with grooves cooperating with scraper elements to reduce the losses of liquid.

24. Transmission device according to claim 1, in which a said transmission assembly comprises a tensioner pressing on the belt to tension it under the effect of a pressure of liquid, the tensioner being actuated by a jack acting under the effect of oil under high pressure on one face and low pressure on the other, the whole in a manner to set the tensioner in action only when then the corresponding transmission assembly is in service.

25. Transmission device according to claim 1, in which the belt connecting the pulleys of one transmission assembly is crossed in a manner to reverse the sense of rotation of the said pulleys, the said transmission assembly being able to constitute the reverse drive of a speed change box.

* * * * *